(No Model.)
M. V. B. HOWE.
VEHICLE HUB ATTACHMENT.
No. 575,649.  Patented Jan. 19, 1897.
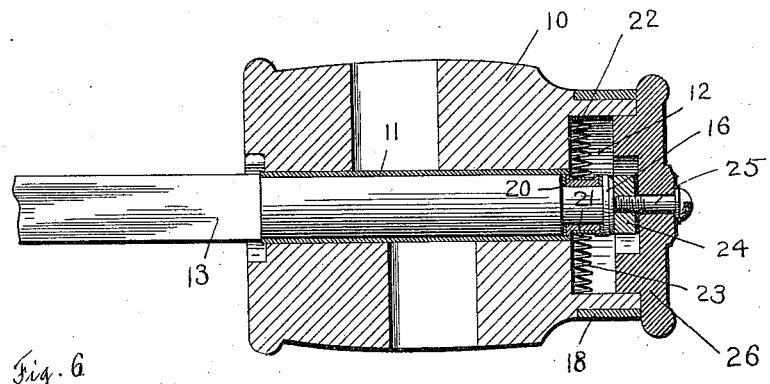
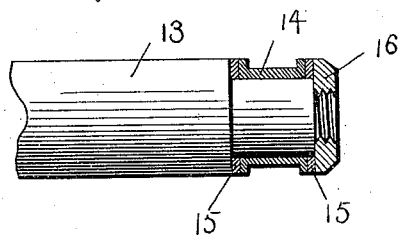
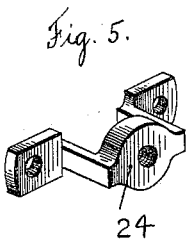
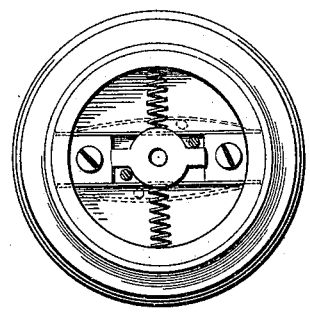
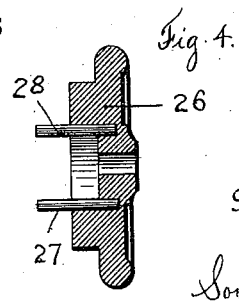
Witnesses.
Chas. F. Schuch
E. M. Healy
Inventor.
M. V. B. Howe,
By
Southgate & Southgate
Attorneys

UNITED STATES PATENT OFFICE.

MARTIN V. B. HOWE, OF GARDNER, MASSACHUSETTS.

VEHICLE-HUB ATTACHMENT.

SPECIFICATION forming part of Letters Patent No. 575,649, dated January 19, 1897.

Application filed April 29, 1896. Serial No. 589,597. (No model.)

*To all whom it may concern:*

Be it known that I, MARTIN V. B. HOWE, a citizen of the United States, residing at Gardner, in the county of Worcester and State of Massachusetts, have invented a new and useful Improvement in Vehicle-Hubs, of which the following is a specification.

The object of my invention is to provide simple and efficient means for detachably securing a vehicle-hub upon its axle and to combine and arrange the parts so as to provide a substantially dust-proof construction.

To these ends my invention consists of the parts and combinations of parts, as hereinafter described, and more particularly pointed out in the claims at the end of this specification.

In the accompanying drawings, Figure 1 is a sectional view of a vehicle-hub constructed according to my invention. Fig. 2 is an end view of the same, the cap or cover being removed. Fig. 3 is an end view of the cap or cover. Fig. 4 is a sectional view taken on the line 4 4 of Fig. 3, and Figs. 5 and 6 are detail views to be hereinafter referred to.

In carrying out my invention I preferably employ an axle having a sleeve rotatably mounted thereon, and I provide the hub with means for detachably engaging said sleeve, so as to secure said hub upon the axle. By means of this construction the sleeve will turn or rotate with the hub, and the parts will be secured together, so as to produce comparatively little friction or wear.

Referring to the drawings and in detail, 10 designates a hub, which may be formed of wood in the ordinary manner and may be provided with the usual metallic bushing 11. Fitting into the bushing 11 is the axle 13, which is turned down at its outer end, and is provided with a rotatable grooved sleeve 14, which is secured in place by means of a nut 16, threaded onto the outer end of the axle. At each side of the grooved sleeve 14 I preferably provide leather or soft-metal washers 15. The retaining-nut 16 is beveled or chamfered on its outer edge, so that the same will engage with devices which are mounted in the hub for detachably engaging the sleeve 14. At its outer end the hub 10 is counterbored or chambered, as at 12. Mounted in the chamber 12 are two transverse flat springs 20 and 21, which are arranged to fit into and engage the groove in the sleeve 14. By means of this construction it will be seen that when the parts are assembled or secured together the springs 20 and 21 will engage with and hold the sleeve 14, so that the same will turn or rotate with the hub and at the same time will secure the hub in place upon the axle.

If desired, the transverse flat springs 20 and 21 may be reinforced and stiffened by means of the supplemental or spiral springs 22 and 23.

A part or bridge-piece 24 is arranged in the chamber 12, so as to substantially engage with the end of the axle 13, and by means of this construction the part or bridge-piece 24 will prevent the retaining-nut 16 upon the axle from becoming unscrewed.

A bolt or screw 25 is threaded into the bridge-piece 24. Journaled on the screw 25 is a cap or cover 26, having an annular collar fitting into the chamber 12, and arranged to engage with a collar 18 upon the hub, so as to form a substantially dust-proof joint, which will prevent the access of dust or dirt to the bearings and will also prevent oil or grease from the bearings from escaping or oozing out into position to soil the clothing if one should happen to brush against the end of the hub.

Projecting from the inner side of the cap or cover 26, as most clearly illustrated in Figs. 2 to 4, inclusive, are releasing-pins 27 and 28, which are arranged between the transverse flat springs 20 and 21.

When the cover or cap 26 is turned, as indicated by dotted lines in Fig. 2, the releasing-pins 27 and 28 will force the flat transverse springs 20 and 21 out of engagement with the grooved sleeve 14 upon the axle, and will release the hub, so that the same can then be removed or taken off from the axle.

In some cases it may be desirable to secure the parts together, so that the cover or cap 10 will be prevented from turning to release the hub from its axle, and in order to accomplish this result it is simply necessary to tighten the bolt or screw 25, so as to clamp the cover or cap 26 and prevent the same from turning.

I am aware that many changes may be made in vehicle-hubs by those who are skilled in the art without departing from the scope of my invention as expressed in the claims. I do not wish, therefore, to be limited to the form which I have shown and described; but What I do claim, and desire to secure by Letters Patent of the United States, is—

1. The combination of an axle 13, a grooved sleeve 14 journaled near the outer end of the axle, a nut 16 for holding the sleeve in place, a hub 10, flat, transverse springs 20 and 21 mounted in said hub, and arranged to engage opposite sides of the grooved sleeve 14 to detachably secure the hub upon the axle, and a cover rotatably mounted upon the hub, and having pins for releasing the flat springs from the grooved sleeve, substantially as described.

2. The combination of an axle, a sleeve rotatably mounted on said axle, a nut or bolt threaded onto the axle for keeping the sleeve in place, a hub, means mounted in the hub for detachably engaging said sleeve, and a part or bridge-piece carried by the hub and arranged to substantially engage with the end of the axle to prevent the nut or bolt from unscrewing, substantially as described.

3. The combination of an axle, a grooved sleeve rotatably mounted on said axle, a nut or bolt threaded onto the axle for keeping the sleeve in place, a hub, flat transverse springs mounted in the hub for engaging the grooved sleeve, a part or bridge-piece mounted in the hub, and arranged to substantially engage with the end of the axle to prevent the nut or bolt from unscrewing, and a rotatable cap or cover for the hub having pins for engaging with and releasing the transverse springs, substantially as described.

In testimony whereof I have hereunto set my hand in the presence of two subscribing witnesses.

MARTIN V. B. HOWE.

Witnesses:
   LOUIS W. SOUTHGATE,
   PHILIP W. SOUTHGATE.